United States Patent

[11] 3,550,619

[72] Inventors Peter Robert Halasz
 Park Ridge;
 George Edward King III, Waldwick, N.J.
[21] Appl. No. 739,053
[22] Filed June 21, 1968
[45] Patented Dec. 29, 1970
[73] Assignee Becton, Dickinson and Company
 East Rutherford, N.J.
 a corporation of New Jersey

[54] TUBING HOLDER
 10 Claims, 4 Drawing Figs.
[52] U.S. Cl. .................................................... 137/595,
 23/292; 251/7, 8; 74/55
[51] Int. Cl. ......................................................F16k 11/10,
 B01l 3/00, F16l 55/14
[50] Field of Search........................................... 210/321,
 322; 137/595; 222/214, 485, 486(Inquired);
 73/23.1, (Inquired), 422; 74/3.5, 3.52, 3.54, 3.55,
 (Inquired); 141/236; 23/259, 292; 251/8, 7;
 137/595, 609

[56] References Cited
 UNITED STATES PATENTS
 1,872,792 8/1932 Neorr.............................. 251/8
 2,046,864 7/1936 Baker.............................. 23/292
 3,034,505 5/1962 Sobol ............................. 210/321X
 3,140,734 7/1964 Chauvin ........................ 137/609X
 3,245,269 4/1966 Ivie................................ 251/7X
 3,276,847 10/1966 Duff et al....................... 23/292
 1,686,003 10/1928 Hottinger ...................... 137/594X
 2,492,149 12/1949 Heuver.......................... 137/595
 2,895,653 7/1959 Giepen.......................... 251/9X
 3,203,421 8/1965 Bialick .......................... 251/9X
 3,298,460 1/1967 Porter et al.................... 137/271
 FOREIGN PATENTS
 1,130,107 9/1956 France .......................... 251/9
 1,171,728 10/1958 France .......................... 251/6

Primary Examiner—Henry T. Klinksiek
Attorney—Kane, Dalsimer, Kane, Sullivan and Kurucz ABSTRACT: A tubing holder, particularly suitable for use in conjunction with dialysis apparatus, includes a substantially rigid member having a clearance slot extending longitudinally along its length. The holder is provided with boreholes extending transverse to the slot. The holder maintains the tubing in a predetermined position and provides a secure location for the fluid control valves in the recess formed by the clearance slot thus substantially eliminating the danger of malfunction due to misalignment and accidental contact with the flow control valves.

PATENTED DEC 29 1970
3,550,619
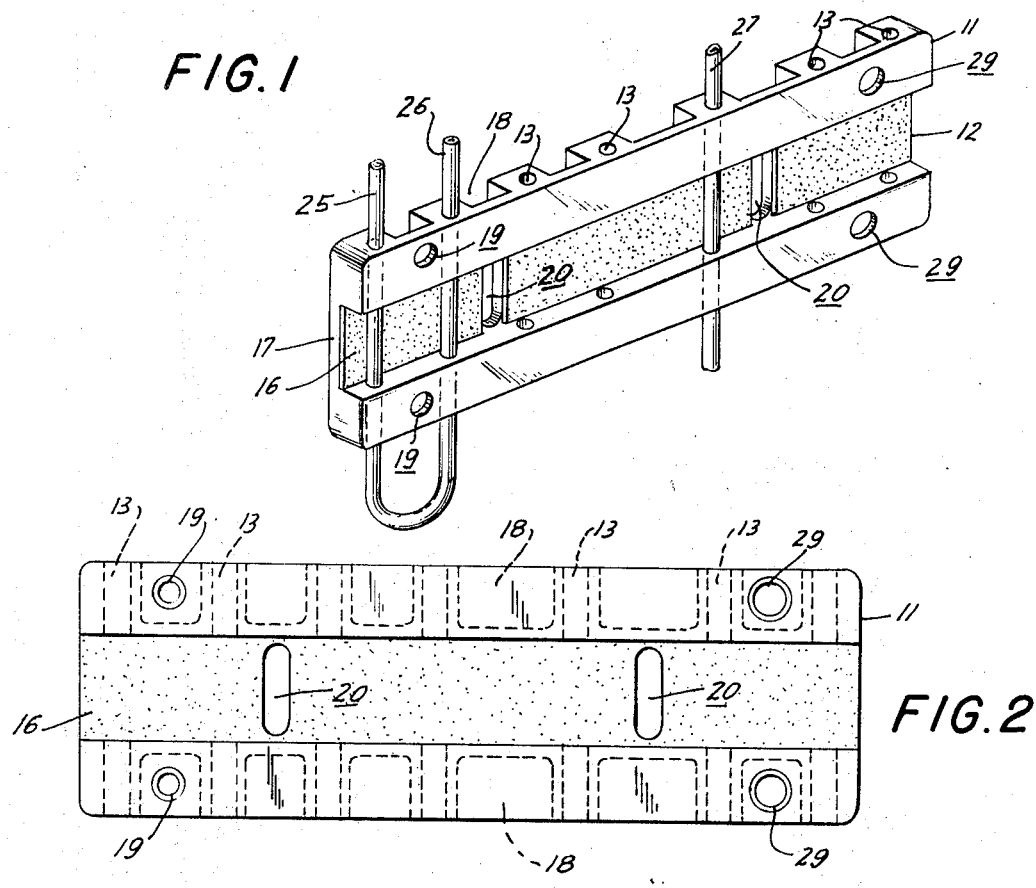
FIG.1
FIG.2
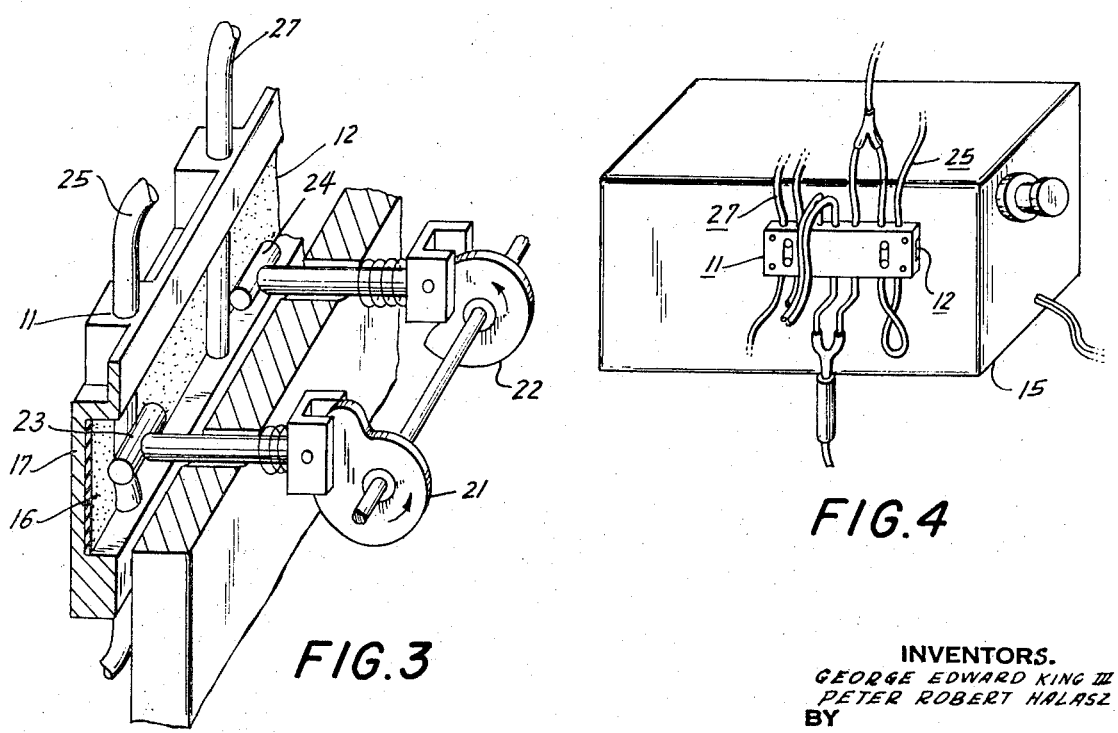
FIG.3
FIG.4
INVENTORS.
GEORGE EDWARD KING III
PETER ROBERT HALASZ
BY
Kane, Dalsimer, Kane, Sullivan & Smith
ATTORNEYS

TUBING HOLDER

Brief Description of the Invention

This invention relates to a holder for maintaining tubing in a predetermined position and, more particularly, to a holder for maintaining connecting tubes of a dialysis apparatus in predetermined positions.

Assembling connecting tubing of apparatus for use in the medical field such, for example, as a peritoneal dialysis apparatus is difficult and often requires skilled help. Such tubing must be maintained in a predetermined position to provide security for the patient and protect against malfunctioning. In addition, it is frequently necessary to have the valve-controlling fluid flow in the tubing in a secure position away from moving parts to avoid accidental contact with the valves.

Although many attempts were made to overcome the foregoing and other difficulties, none, as far as we are aware, was entirely successful when carried into practice commercially.

BRIEF SUMMARY

We have now developed a tubing holder particularly suitable for use in conjunction with peritoneal dialysis apparatus, which maintains tubing in a predetermined position, provides a secure location for control valves, and substantially eliminates malfunctioning due to misalignment and accidental contact with connecting tubing and fluid control valves of the apparatus. When used in conjunction with peritoneal dialysis apparatus, the holder facilitates assembly of the apparatus and connecting tubes and permits a patient to assemble the apparatus without the necessity for skilled assistance.

It is an object of this invention to provide a holder which will maintain tubing in a predetermined position substantially eliminating accidental misalignment.

Another object of this invention contemplates a secure position for valves which control fluid flow in the tubing.

Still another object of this invention is to provide a simplified means for permitting a patient to properly assemble the tubing of a peritoneal dialysis apparatus.

Other objects and advantages will become apparent from the following description taken in conjunction with the accompanying drawings in which:

FIG. 1 is a perspective view of the tubing holder;

FIG. 2 is a rear elevational view of the tubing holder shown in FIG. 1;

FIG. 3 is a perspective view (partly in section) of the tubing holder and cam actuated flow shut off valves showing the fluid control valves positioned in or adjacent the recess formed by the clearance slot of the holder; and FIG. 4 is a perspective view of the tubing holder in conjunction with peritoneal dialysis apparatus.

In accordance with our invention, the tubing holder comprises a substantially rigid member having a clearance slot extending longitudinally along the member and at least one borehole to accommodate the tubing extending vertically and substantially transverse to the clearance slot. Where more than one tube is to be accommodated, the holder can be provided with a plurality of boreholes in spaced relationship substantially parallel to each other and perpendicular to the longitudinal axis along which the clearance slot extends. In addition, a flexible, rubber-type material can be cemented to the clearance slot wall to compensate for variance in dimensional tolerances and misalignment when the holder is used in conjunction with various dialysis apparatus.

PREFERRED EMBODIMENTS

Referring now to the drawings, FIG. 1 shows the tubing holder 11 in perspective having a clearance slot or channel 12 extending along the longitudinal axis of the holder. A plurality of boreholes 13 are provided to accommodate connecting tubes 25, 26 and 27 for use with dialysis apparatus 15. A flexible rubber-like material 16 is cemented to the slot wall 17 to compensate for variance in dimensional tolerances and misalignment when the holder is used in conjunction with various dialysis apparatus. The holder includes a plurality of U-shaped cutouts 18 which help to prevent warping and add to the attractiveness of the design of the holder. The holder is also provided with a number of locating holes 19 and 29, and alignment slots 20 for use in attaching the holder to dialysis apparatus. Holes 29 are of larger diameter than holes 19 to facilitate proper positioning of the holder on dialysis apparatus having corresponding sized holes.

FIG. 3 shows a perspective view of the holder 11 in conjunction with a pair of cam actuated 21 and 22 fluid control valves 23 and 24. As can be seen in FIG. 3, the valves are situated in a recessed position in the clearance slot 12 which avoids accidental contact with other moving parts. Valve 23 is shown in the cutoff position with fluid flow completely stopped while valve 24 is shown in an open retracted position permitting fluid flow in the tubing. In both positions the valves are so positioned as to be out of contact with other parts in the dialysis apparatus.

FIG. 4 shows a perspective view of the tubing holder in combination with a peritoneal dialysis apparatus 15. When used in combination with the dialysis apparatus, the recessed position for the flow cutoff valves minimizes the possibility of accidental misalignment of the dialysis tubing, provides security for a patient undergoing dialysis and protects against malfunctioning of the apparatus. The peritoneal dialysis apparatus 15 has tubing 25 and 27 which is used to deliver sterile dialysate to and from the patient under peritoneal dialysis.

Since the cam forces the tubing against the clearance slot wall in the off position, the tubing holder should be formed of substantially rigid material to offer resistance to bending and misalignment of the holder and tubing. The material of which the holder is formed should withstand gas sterilization and be compatible with polyvinylchloride. If the holder is constructed of a hard plastic material, it can be fabricated cheaply by thermoplastic injection molding techniques.

The tubing holder described in accordance with this invention can be used in conjunction with any apparatus in which liquids or fluids are required to flow in a controlled manner, e.g. a photography etching bath, or are transferred from a remote site and gated, manifolded or otherwise mixed.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A tubing holder, particularly suitable for use with dialysis apparatus, comprising an elongated substantially rigid member of essentially rectangular configuration having a longitudinal axis, a pair of spaced wall portions forming part of said member and extending in substantially parallel relationship with the longitudinal axis, an exposed clearance slot extending longitudinally along the length of the member and parallel to the longitudinal axis defined between said wall portions to provide a recess position for the tubing associated with said holder and for receiving fluid control valves, a flexible material cemented to the clearance slot to serve as a backing for said tubing and to compensate for variances in dimensional tolerance and misalignment of said tubing, and a plurality of boreholes extending through both of the wall portions of the member transverse to and communicating with the clearance slot with the holes of one wall portion being aligned with the holes of the other wall portion to accommodate and maintain the tubing in a predetermined aligned position and exposed in said slot.

2. A tubing holder in accordance with claim 1 having U-shaped cutouts positioned above and below the clearance slot to improve the holder's resistance to warpage.

3. A tubing holder in accordance with claim 2 including at least one locking slot to facilitate alignment and fastening of the holder.

4. A tubing holder in accordance with claim 3 formed of hard plastic material.

5. In combination with a tubing holder of claim 1, a dialysis apparatus having the tubing holder mounted thereon, said dialysis apparatus including a plurality of connecting tubes for delivering dialysate to and from a patient undergoing dialysis, said tubing extending through said boreholes of the holder and resting on said flexible-backing material, and a plurality of valves for controlling the flow of dialysate in the tubing, said valves positioned in the recess formed by the clearance slot whereby the tubing is maintained in a predetermined aligned position substantially free from accidental misalignment.

6. A tubing holder and dialysis apparatus in accordance with claim 5 wherein the apparatus is adapted for use in peritoneal dialysis.

7. A tubing holder and dialysis apparatus in accordance with claim 6 wherein the holder includes a plurality of locking slots for precision adjustment and alignment of the holder.

8. A tubing holder and dialysis apparatus in accordance with claim 7 wherein the holder includes a plurality of U-shaped cutouts to prevent warpage of the holder.

9. A tubing holder and dialysis apparatus in accordance with claim 8 wherein the holder is formed of a hard plastic material.

10. A tubing holder and dialysis apparatus in accordance with claim 9 wherein the holder includes a plurality of locating holes of differing sizes and the dialysis apparatus is provided with holes corresponding in size to the locating holes to facilitate proper positioning of the holder on the dialysis apparatus.